UNITED STATES PATENT OFFICE.

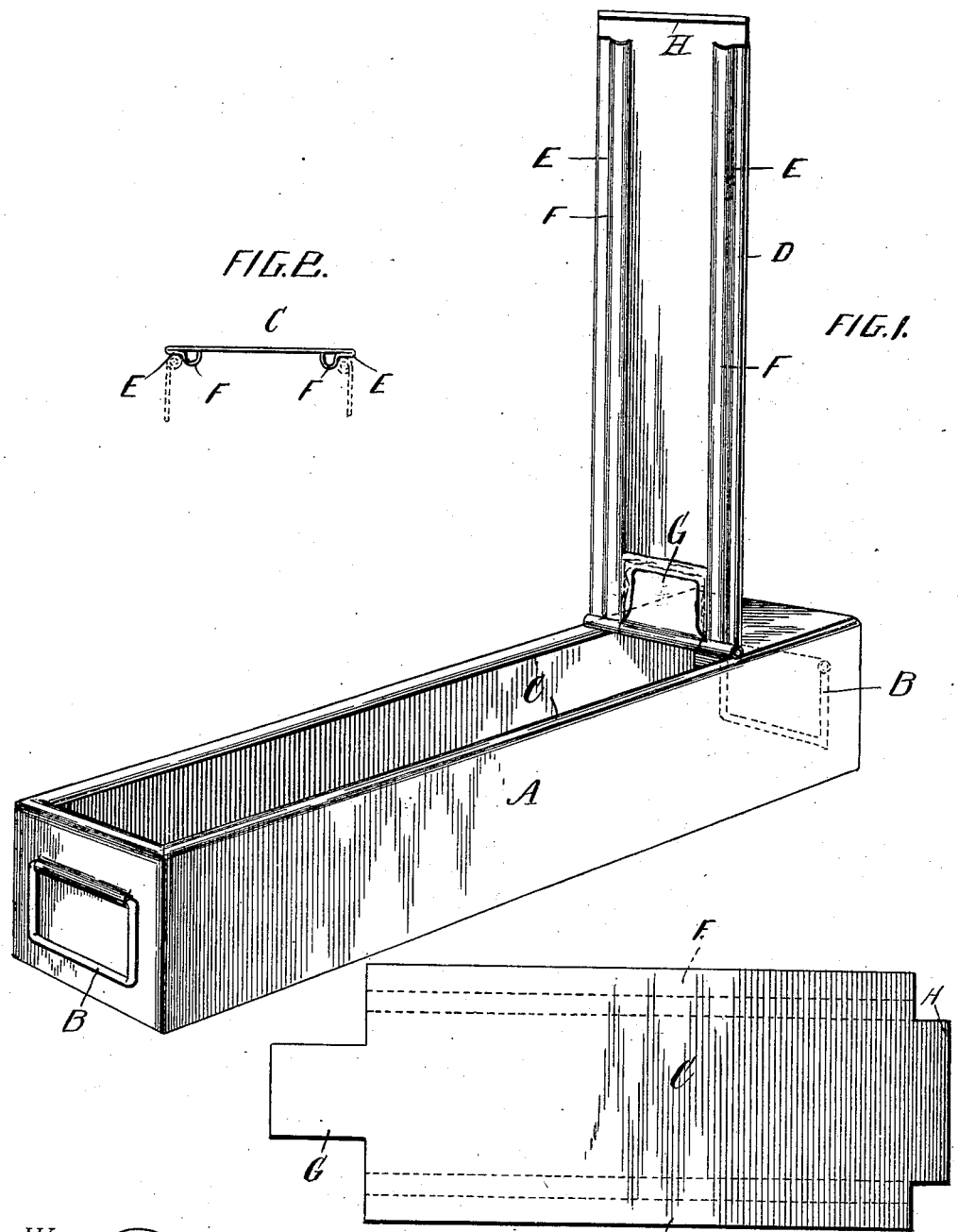

HARRY W. HOLDER, OF DURHAM, CONNECTICUT.

COVER FOR SAFE-DEPOSIT BOXES.

No. 886,213.　　　　　Specification of Letters Patent.　　　Patented April 28, 1908.

Application filed January 25, 1908. Serial No. 412,639.

*To all whom it may concern:*

Be it known that I, HARRY W. HOLDER, a citizen of the United States, residing at Durham, in the county of Middlesex and State of Connecticut, have invented certain new and useful Improvements in Covers for Safe-Deposit Boxes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in covers for safe deposit boxes, etc., and the object in view is to produce a device of this nature comprising a box having a hinged cover with the opposite longitudinal edges thereof bent to form beadings which engage the inner marginal edges of the box when the cover is closed and form a close or tight joint between the cover and box.

The invention comprises various details of construction, combinations and arrangements of parts which will be hereinafter fully described and then specifically defined in the appended claims.

My invention is illustrated in the accompanying drawings, in which:—

Figure 1 is a perspective view of my improved box with the lid or cover open. Fig. 2 is an end view of the cover, and Fig. 3 is a detailed view of the cover showing the blank before the beadings are formed therein.

Reference now being had to the details of the drawings by letter, A designates a box which may be of any suitable shape and provided with handles B at the ends thereof. About the marginal edge of the box is a beading C, and D is a cover hinged as shown in the drawings. Said cover is made of a single piece of sheet metal, the opposite longitudinal edges of which are bent to form flanges E, in each of which is formed a longitudinal beading F. Said flanges after the beading is formed are turned against the under surface of the cover and held in such position by means of a strip G and solder for holding said strip. The strip is adapted to receive a pivotal pin forming a hinge whereby the cover is pivoted to the box. Said beadings F formed upon the cover are parallel with each other and adapted to fold inside the box and adjacent to the beadings along the marginal edge of the latter, thereby forming a tight joint. The beadings F terminate a slight distance from the free end of the cover so that they will not interfere with the latter closing. The extreme free end of the cover has a hem H at the end thereof and projects slightly beyond the end of the box forming means whereby the cover may be conveniently raised or opened.

From the foregoing, it will be noted that, by the provision of a cover for a deposit box as shown and described, a simple and efficient means is afforded in which the cover, flanges and the beadings are all made of one piece of metal and so constructed that a tight joint is afforded when the cover is closed.

What I claim is:—

In combination with a safe deposit box having a beading along the longitudinal marginal edges of the opening therein, a cover hinged to the box and having longitudinal flanges turned back against the under surface thereof and each flange having a longitudinal beading adapted to bear against the beading upon the edge of the opening in the box, the ends of said flanges terminating a slight distance from the ends of the cover and adapted to bear against the end beading of the opening with a portion of the cover projecting beyond the end of the box, as set forth.

In testimony whereof I hereunto affix my signature in the presence of two witnesses.

HARRY W. HOLDER.

Witnesses:
　ELIZABETH L. CAMP,
　FANNY B. HUBBARD.